United States Patent
Wang et al.

(10) Patent No.: US 8,141,101 B2
(45) Date of Patent: Mar. 20, 2012

(54) MINIMIZING MESSAGE FLOW WAIT TIME FOR MANAGEMENT USER EXITS IN A MESSAGE BROKER APPLICATION

(75) Inventors: Ping Wang, Beijing (CN); Hang Xiao, Beijing (CN); Jean Xu Yu, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1221 days.

(21) Appl. No.: 11/854,205

(22) Filed: Sep. 12, 2007

(65) Prior Publication Data

US 2009/0070779 A1  Mar. 12, 2009

(51) Int. Cl.
*G06F 9/46* (2006.01)
*G06F 9/54* (2006.01)

(52) U.S. Cl. .................. 719/313; 719/314; 719/315

(58) Field of Classification Search .................. None
See application file for complete search history.

(56) References Cited

U.S. PATENT DOCUMENTS

| 6,792,604 B1 * | 9/2004 | Hickson et al. ............ 719/312 |
| 2004/0123294 A1 | 6/2004 | Fussell |
| 2005/0013251 A1 | 1/2005 | Wang et al. |
| 2006/0015625 A1 | 1/2006 | Ballinger et al. |
| 2006/0101148 A1 | 5/2006 | Herrmann |
| 2007/0005684 A1 | 1/2007 | Vitanov et al. |

FOREIGN PATENT DOCUMENTS

JP 63184433 7/1988

* cited by examiner

*Primary Examiner* — Qing Wu
(74) *Attorney, Agent, or Firm* — Yee & Associates, P.C.; Jeffrey S. LaBaw

(57) ABSTRACT

A method for minimizing the message flow wait time for management user exits in a message broker application. A message broker application processes a request in a request and a response message flow. The request message flow generates a request identifier, collects information about the request message flow, and stores the request identifier and information in a global data map. The response message flow uses the request identifier to access the map and read the collected information without having to acquire a lock on the map. The response message flow also collects information about the response message flow, and generates management information about the request based on the information about the request message flow and the information about the response message flow. A dedicated clean up thread in the message broker application is used to remove used items from the global data map.

20 Claims, 6 Drawing Sheets

```
                messageBrokerAppProcess.loadUserExits(mgmtApp.dll);
        508 ~~ request flow------------------------------------
                requestFlowAppThread.start();
                in the requestFlowApp thread (User Exit #1), start_time =
                mgmtApp.getCurrentTime();
        506 ~~ mgmtApp.getLock(dataMap);
502 {   510 ~~ mgmtApp.insert(requestID, start_time, dataMap);
        512 ~~ mgmtApp.releaseLock(dataMap);
                requestFlowApp.processRequest();
                requestFlowAppThread.stop();
                backEndServer.process();
        514 ~~ response flow----------------------------------
                responseFlowAppThread.start();
                in the responseFlowApp thread (User Exit #4), stop_time =
                mgmtApp.getCurrentTime();
        516 ~~ mgmtApp.getLock(dataMap);
504 {   518 ~~ start_time(T1) = mgmtApp.find(requestID, dataMap);
        520 ~~ mgmtApp.delete(requestID, dataMap);
        522 ~~ mgmtApp.releaseLock(dataMap);
                response_time = stop_time(T2) - start_time(T1);
                responseFlowAppThread.stop();
```

*FIG. 5*

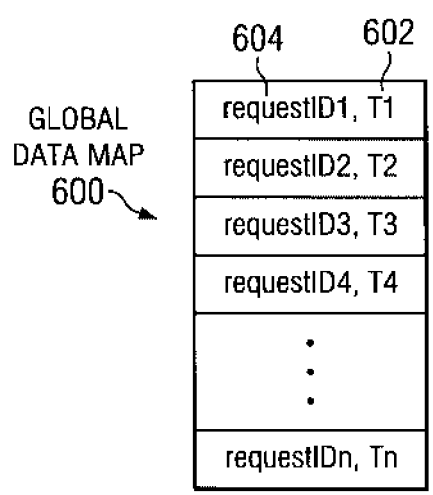

*FIG. 6*

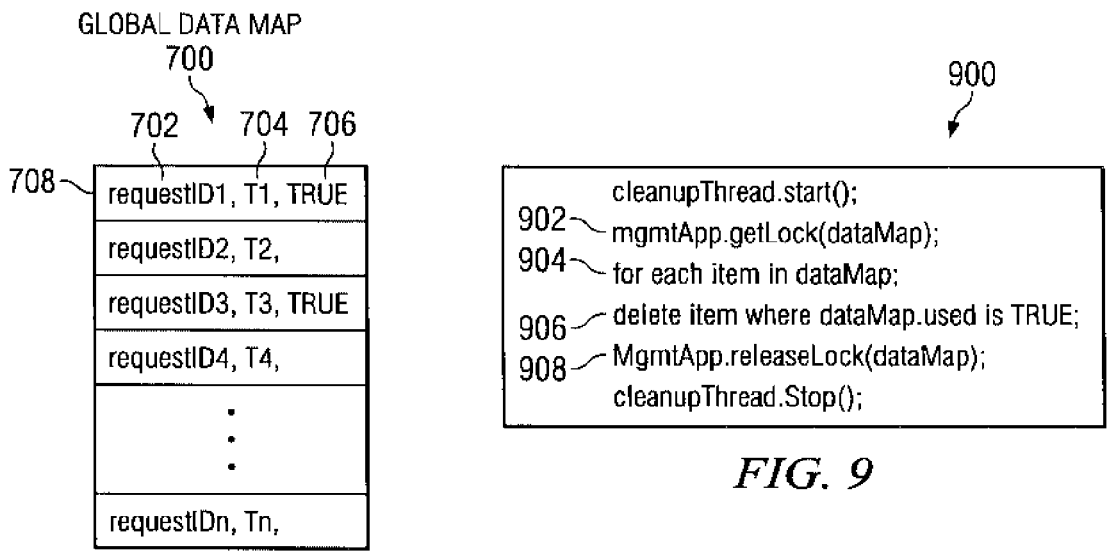
FIG. 7
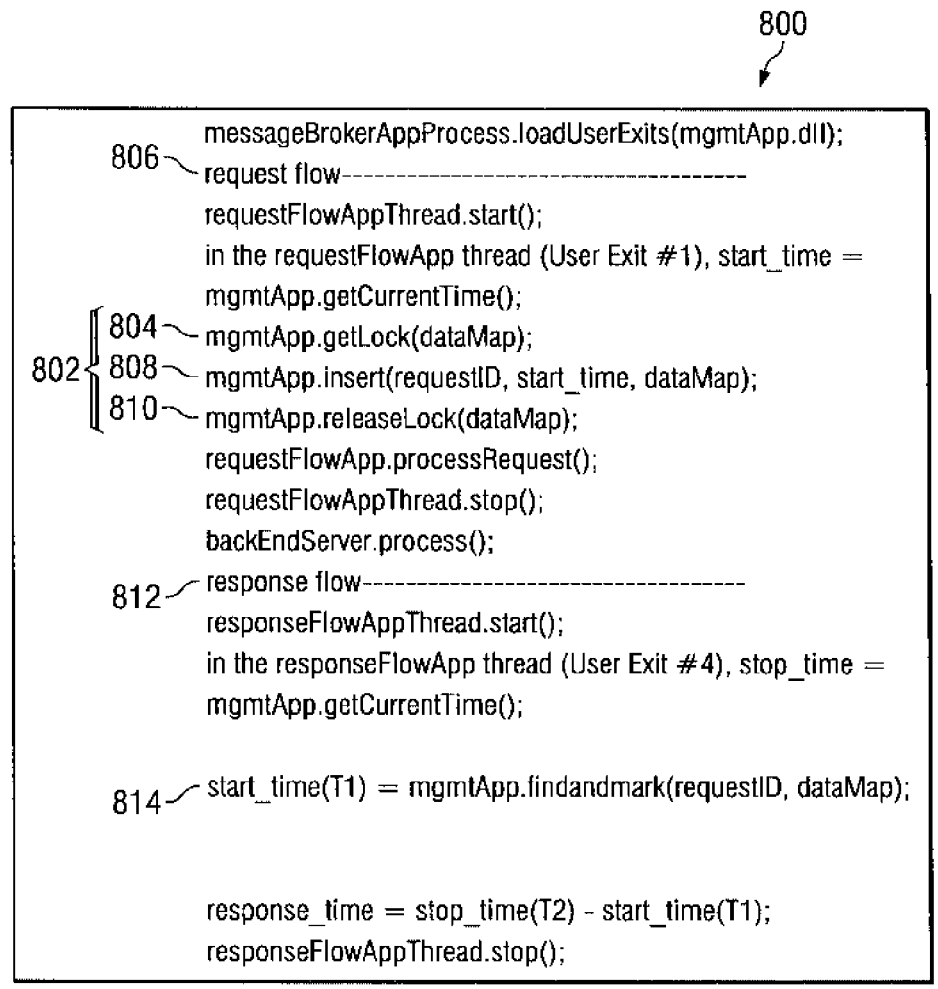
FIG. 9
FIG. 8

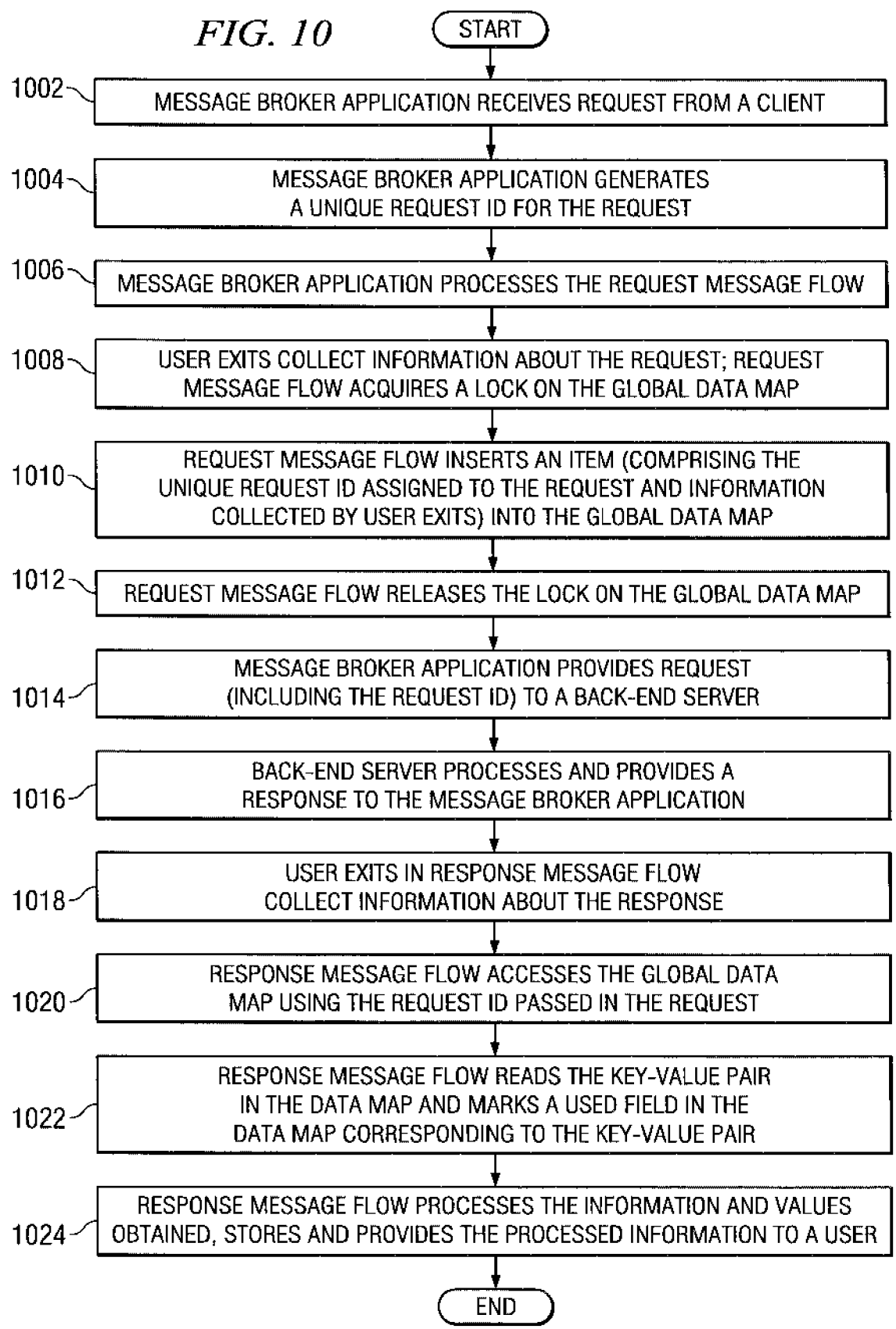

MINIMIZING MESSAGE FLOW WAIT TIME FOR MANAGEMENT USER EXITS IN A MESSAGE BROKER APPLICATION

BACKGROUND OF THE INVENTION

1. Field of the Invention

The present invention relates generally to an improved data processing system, and in particular to a computer implemented method, data processing system, and computer program product for minimizing the message flow wait time for management user exits in a message broker application.

2. Description of the Related Art

Message (event) brokers are common middleware for large computer installations. Middleware is software that mediates between an application program and a network, managing the interaction between disparate applications across heterogeneous computing systems or platforms. These systems or platforms may be arranged in multiple layers, with an underlying system and multiple systems overlaying one another.

Message broker applications integrate existing software applications by typically providing mechanisms for connecting, routing, and transforming business data (messages) from a variety of transports without the need to change the underlying applications generating/consuming the data. Message flows are single threaded programs that process messages in a message broker. Message flows are considered the basic building blocks for message brokers. For example, FIG. 1 illustrates a typical web-based message broker application. In this example, two message flows in the message broker application are shown—one message flow (request message flow) 102 which processes a request to a back-end server, and another message flow (response message flow) 104 which processes the response to the request. Specifically, the request flow comprises hypertext transfer protocol input (HTTPInput 106) which generates message queue output (MQOutput 110) via a computation step, compute1 108. This MQOutput 110 is then provided to back-end server 112. The response flow 104 from back-end server 112 comprises a message queue input (MQInput 114) which generates HTTPReply 118 via a computation step, compute2 116.

A message broker application can dynamically load user exits. User exits comprise interfaces to a message broker application in which application developers may include additional management functionality, such as monitoring the performance of the message broker application. A user exit is invoked by a message broker application to provide the user defined management functionality in response to the occurrence of an event. Examples of events which trigger the invocation of a user exit in the message broker may include receiving a request, completing processing of the request, receiving the response, and completing processing of the response, among many others.

FIG. 2 illustrates how user exits may be invoked in various phases of message broker application 202. Web client 204 sends a request to back-end server 206 via message broker application 202, which generates request flow 208 and response flow 210. In this example, user exits may be invoked at location 1 212 when the request is received at message broker application 202, and at location 2 214 before and after the request is processed by message broker application 202. User exits may also be invoked at location 3 216 before and after the response is processed by message broker application 202, and at location 4 218 prior to the response being sent from message broker application 202 to web client 204.

Request and response flows are often executed in different execution threads in an asynchronous manner. Consequently, user exits in request/response message flows rely on the ability to pass data from the request message flow to the response message flow using a unique request identifier (ID), since one user exit does not know of the existence of the other user exits. Thus, when monitoring the progress of a request/response through a message broker application over multiple user exits, information obtained at one user exit may be accessed by another user exit further down the path by passing a request identifier between the message flows.

While conventional message broker applications allow information to be passed from a request message flow to the response message flow, conventional message broker applications employ algorithms which require a lock to be acquired on the global data map each time an item in the map is accessed. The wait time needed to process requests in these conventional message broker applications may result in a significant amount of overhead, since a response flow must wait to acquire a lock on the global data map before the response can be processed. In addition, when an item is added into or removed from a conventional global data map, the add/remove operation usually invalidates the iterators in the map. Iterators are objects which point to other objects in a container and are used to access those objects in turn. Iterators are typically used to iterate over a range of objects. If an iterator points to a certain item in the range, then adding/removing entries from the global data map can cause rearrangement of the existing iterators. Therefore, an original iterator can point to a different item after the rearrangement, and thus the iterators to the existing items in the map are no longer valid. Consequently, a read operation on the map to an existing item in the map cannot be performed using the invalidated iterators.

SUMMARY OF THE INVENTION

The illustrative embodiments provide a computer implemented method, data processing system, and computer program product for minimizing the message flow wait time for management user exits in a message broker application. When a request is received at a message broker application, the request is processed in a request message flow and a response message flow. In the request message flow, a unique request identifier is generated for the request, and information about the request message flow is collected at user exits in the request message flow. The request message flow acquires a lock on a global data map to perform an insert operation of the unique request identifier and the information about the request to form a key-value pair in the global data map. The request message flow releases the lock on the global data map when the insert operation is complete, and passes the unique request identifier to the response message flow.

In the response message flow, information is collected about the response message flow at user exits in the response message flow. The response message flow uses the unique request identifier passed to the response message flow to access the key-value pair without acquiring a lock on the global data map. The response message flow reads the value comprising information about the request message flow in the key-value pair and generates management information about the request based on the information about the request message flow and the information about the response message flow.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is an example of pseudocode illustrating locks required for a wet request in existing message broker applications;

FIG. 6 is a block diagram of a global data map;

FIG. 7 is a global data map in accordance with the illustrative embodiments;

FIG. 8 is an example of pseudocode illustrating locks required for a web request in accordance with the illustrative embodiments;

FIG. 9 is an example of pseudocode for deleting marked items in accordance with the illustrating embodiments;

FIG. 10 is a flowchart of a process for minimizing the message flow wait time for management user exits in a message broker application in accordance with the illustrative embodiments.

DETAILED DESCRIPTION OF THE PREFERRED EMBODIMENT

Figure 3:
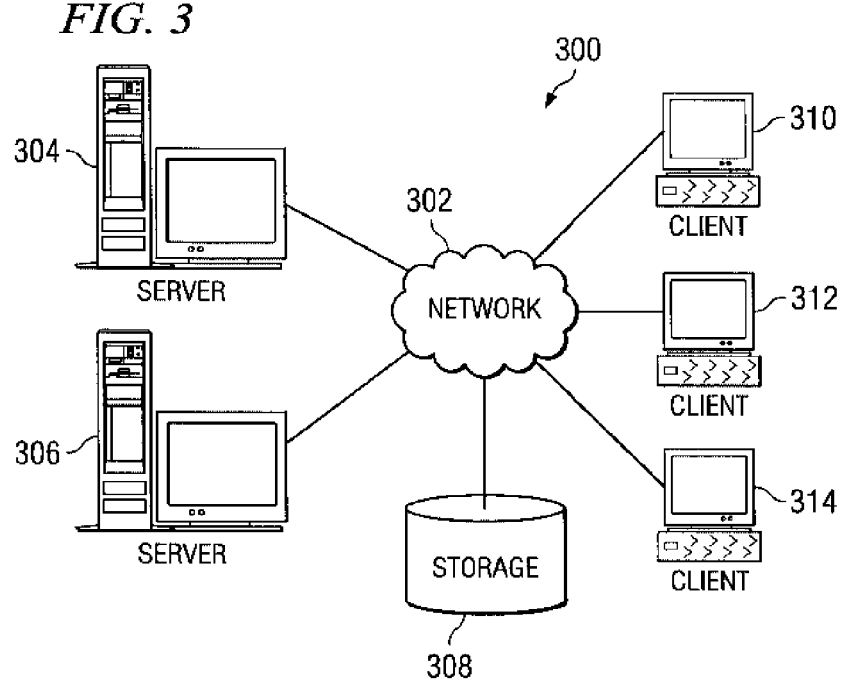
FIG. 3 depicts a pictorial representation of a distributed data processing system in which the illustrative embodiments may be implemented.
Figure 4:
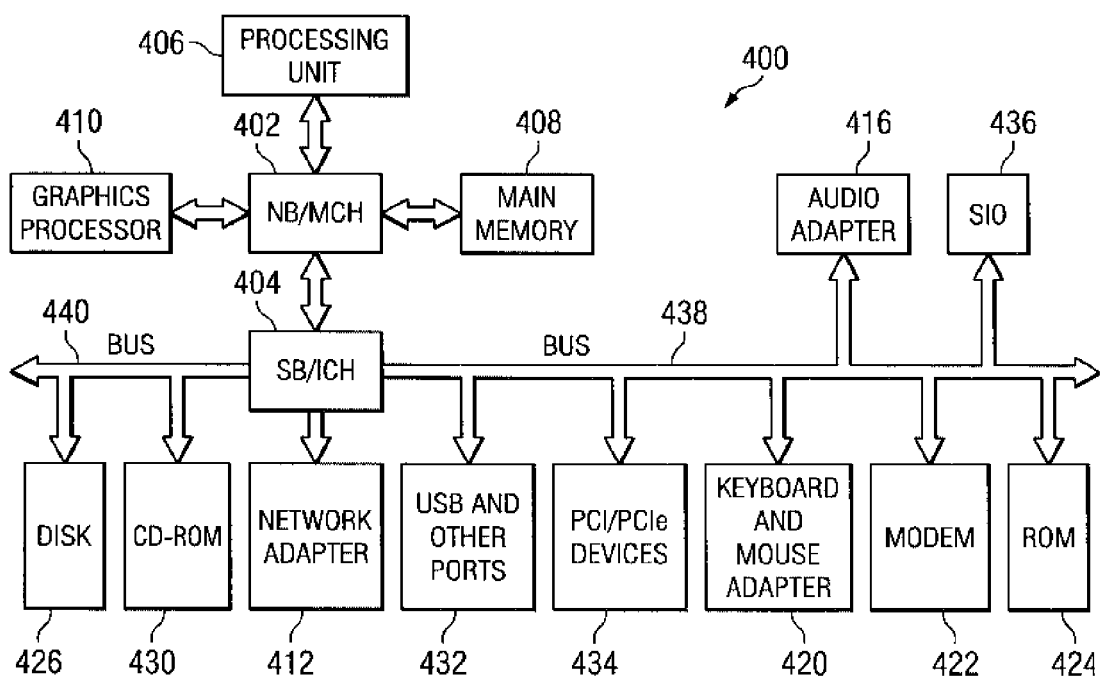
FIG. 4 is a block diagram of a data processing system in which the illustrative embodiments may be implemented.

With reference now to the figures and in particular with reference to FIGS. 3-4, exemplary diagrams of data processing environments are provided in which illustrative embodiments may be implemented. It should be appreciated that FIGS. 3-4 are only exemplary and are not intended to assert or imply any limitation with regard to the environments in which different embodiments may be implemented. Many modifications to the depicted environments may be made.

FIG. 3 depicts a pictorial representation of a network of data processing systems in which illustrative embodiments may be implemented. Network data processing system 300 is a network of computers in which the illustrative embodiments may be implemented. Network data processing system 300 contains network 302, which is the medium used to provide communications links between various devices and computers connected together within network data processing system 300. Network 302 may include connections, such as wire, wireless communication links, or fiber optic cables.

In the depicted example, server 304 and server 306 connect to network 302 along with storage unit 308. In addition, clients 310, 312, and 314 connect to network 302. Clients 310, 312, and 314 may be, for example, personal computers or network computers. In the depicted example, server 304 provides data, such as boot files, operating system images, and applications to clients 310, 312, and 314. Clients 310, 312, and 314 are clients to server 304 in this example. Network data processing system 300 may include additional servers, clients, and other devices not shown.

In the depicted example, network data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 300 also may be implemented as a number of different types of networks, such as for example, an intranet, a local area network (LAN), or a wide area network (WAN). FIG. 3 is intended as an example, and not as an architectural limitation for the different illustrative embodiments.

With reference now to FIG. 4, a block diagram of a data processing system is shown in which illustrative embodiments may be implemented. Data processing system 400 is an example of a computer, such as server 304 or client 310 in FIG. 3, in which computer usable program code or instructions implementing the processes may be located for the illustrative embodiments.

In the depicted example, data processing system 400 employs a hub architecture including interface and memory controller hub (interface/MCH) 402 and interface and input/output (I/O) controller hub (interface/ICH) 404. Processing unit 406, main memory 408, and graphics processor 410 are coupled to interface and memory controller hub 402. Processing unit 406 may contain one or more processors and even may be implemented using one or more heterogeneous processor systems. Graphics processor 410 may be coupled to the interface/MCH through an accelerated graphics port (AGP), for example.

In the depicted example, local area network (LAN) adapter 412 is coupled to interface and I/O controller hub 404 and audio adapter 416, keyboard and mouse adapter 420, modem 422, read only memory (ROM) 424, universal serial bus (USB) and other ports 432, and PCI/PCIe devices 434 are coupled to interface and I/O controller hub 404 through bus 438, and hard disk drive (HDD) 426 and CD-ROM 430 are coupled to interface and I/O controller hub 404 through bus 440. PCI/PCIe devices may include, for example, Ethernet adapters, add-in cards, and PC cards for notebook computers. PCI uses a card bus controller, while PCIe does not. ROM 424 may be, for example, a flash binary input/output system (BIOS). Hard disk drive 426 and CD-ROM 430 may use, for example, an integrated drive electronics (IDE) or serial advanced technology attachment (SATA) interface. A super I/O (SIO) device 436 may be coupled to interface and I/O controller hub 404.

An operating system runs on processing unit 406 and coordinates and provides control of various components within data processing system 400 in FIG. 4. The operating system may be a commercially available operating system such as Microsoft® Windows Vista™ (Microsoft and Windows Vista are trademarks of Microsoft Corporation in the United States, other countries, or both). An object oriented programming system, such as the Java™ programming system, may run in conjunction with the operating system and provides calls to the operating system from Java™ programs or applications executing on data processing system 400. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 426, and may be loaded into main memory 408 for execution by processing unit 406. The processes of the illustrative embodiments may be performed by processing unit 406 using computer implemented instructions, which may be located in a memory such as, for example, main memory 408, read only memory 424, or in one or more peripheral devices.

The hardware in FIGS. 3-4 may vary depending on the implementation. Other internal hardware or peripheral devices, such as flash memory, equivalent non-volatile memory, or optical disk drives and the like, may be used in addition to or in place of the hardware depicted in FIGS. 2-3. Also, the processes of the illustrative embodiments may be applied to a multiprocessor data processing system.

In some illustrative examples, data processing system 400 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 408 or a cache such as found in interface and memory controller hub 402. A processing unit may include one or more processors or CPUs. The depicted examples in FIGS. 2-3 and above-described examples are not meant to imply architectural limitations. For example, data processing system 400 also may be a tablet computer, laptop computers or telephone device in addition to taking the form of a PDA.

As previously mentioned, a message broker application may pass data from a request message flow to the response message flow in the message broker application. The data may comprise a unique request ID which identifies a particular request. The unique request ID is used by the response message flow as a key to the global data map. The value in the global data map which corresponds to the key comprises information collected at one or more user exits in the request message flow. In this manner, information collected in the request message flow may be passed to the response message flow. Data may be passed from a request message flow to a response flow for various purposes, such as to calculate the round trip time of a web request as illustrated by pseudocode 500 in FIG. 5.

In FIG. 5, pseudocode 500 comprises critical sections 502 and 504 where a lock on a global data map must be acquired in existing message broker applications before any thread can enter these code sections. Thus, when a message flow must wait on another flow (or queue of flows) to release the other flow's lock on the data map, the message flow incurs an increased wait time to access the data map. A global lock is required in the critical sections to prevent concurrent access to a global data map which links the information obtained at the user exits and the unique request ID passed between the request/response message flows. The global data map is global to all threads in the message broker process. FIG. 6 provides an example global data map which illustrates how monitoring information (e.g., start_time T1 602) collected in the request message flow is linked to the request identifier (e.g., requestID1 604) in a key-value pair in order to pass the information to a response message flow.

As shown in pseudocode 500 in FIG. 5, a lock on the global data map is first obtained in step 506 by request message flow thread 508. A start_time (T1) of the request is then measured and inserted, along with a unique request ID for the request message flow thread, into the global data map in step 510. The lock is then released by the request message flow thread in step 512.

In response flow thread 514, the response message flow needs to access the start time information measured in the request message flow thread. To access the information in the global data map, the response message flow thread first obtains a lock on the global data map in step 516. Using the unique request ID passed from the request message flow thread to the response message flow thread, the response message flow thread then accesses the global data map to find the start_time (T1) corresponding to the unique request ID in step 518. Once the start_time (T1) has been found, the response message flow thread deletes the item in the global data map corresponding to the unique request ID in step 520. The response message flow thread may remove the entry in the global data map once the desired information is obtained by the response message flow thread in order to maintain a global data map of reasonable size. The lock on the global data map is then released by the response message flow thread in step 522.

A problem with the algorithm described in pseudocode 500 is that each of the user exits defined in a request and response flow must acquire a lock (e.g., in steps 506 and 516) to the global data map. For a single web request, the request flow first must wait for a lock to be acquired on the global data map before the request can be processed. The response flow then must wait to acquire the same lock on the global data map before the response can be processed. As a typical message broker application handles hundreds of thousands of requests/responses at any given time, a lock on an item in the global data map by a request flow prohibits any response flow from accessing (i.e., reading) that particular item. Thus, applying the algorithm described in pseudocode 500 to process the requests can result in a significantly large amount of wait time overhead for the response flows (e.g., five times greater response time overhead).

The illustrative embodiments address the problems in the current art and provide for minimizing the message flow wait time for management user exits in a message broker application. The illustrative embodiments provide a new global data map which contains special properties that provide more efficient and concurrent accesses to the nodes in the map. The global data map in the illustrative embodiments is configured to comprise two important mapping properties. One mapping property allows a new item to be inserted into the global data map while not invalidating the iterators pointing to existing items in the map. By not invalidating the iterators to the existing items in the map, the global data map may be accessed concurrently by other message flows while the map is locked by a message flow. For instance, when a request message flow acquires a lock on the global data map in order to insert an item into the map, a separate response message flow may concurrently access the map and read information for another item in the map. Thus, the response message flow may read items in the map as if the insert operation was never performed by the request message flow.

The second mapping property allows an item to be removed/deleted from the global data map while not invalidating the iterators pointing to existing elements in the map. The only exception is that the iterator which points to the item being deleted is removed. Again, since the iterators to the existing items in the map are still valid when the delete operation is performed, the global data map may be accessed concurrently by other message flows while the map is locked by a message flow.

Figure 1:
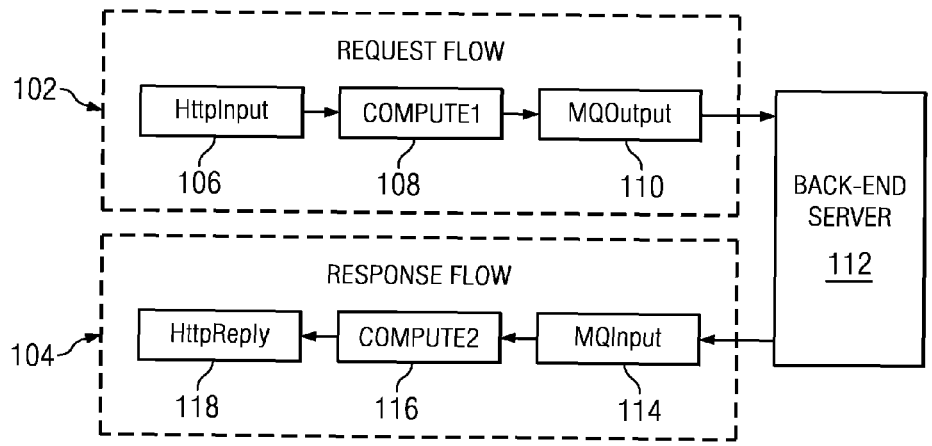
FIG. 1 is a block diagram of a message broker system comprising two message flows.
Figure 2:
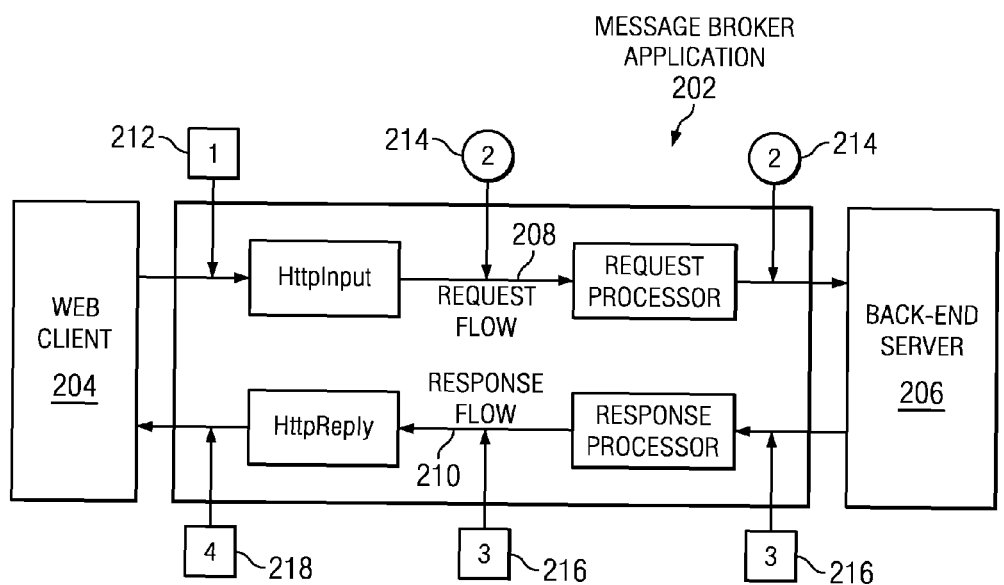
FIG. 2 is a block diagram of a message broker system comprising various user exits.

The illustrative embodiments also observe the pattern of how items in the improved global data map are accessed in the message broker application to determine whether a lock is required when accessing the map. This pattern shows that, in the case of message broker applications, there is never more than one thread trying to read and remove the same item in the map at any given time. As illustrated in FIG. 2, each message flow comprises a different thread of execution. When a request arrives at the message broker application, the request is processed in the request message flow and provided to the back-end server, and the response from the back-end server is processed by the message broker application in the response message flow. Thus, a request message flow having a particular request ID will always be processed by the message broker application before processing a response message flow with the same request ID. Since the request and response threads are always processed in a sequential manner, there will never be more than one of the threads trying to access the same item in the global data map. Based on this observation and the two special properties which are present in the new global data map, the message broker application may access any item in the global data map using a read or find operation without having to first obtain a lock on the map. In other words, no lock is required to be obtained by a response message flow for the response message flow to read an item in the global data map. While no lock is required to read items in the global data map, a lock is still required to insert an item into the map. For instance, in a request message flow, a new key-value pair is created and inserted into the map. The insert operation must first acquire a lock to the map.

Furthermore, the illustrative embodiments reduce message flow wait time by separating, in each of the response flows, the operations which delete items in the global data map from the operations which access items in the map. In the response message flow thread, the message broker application performs a read or find operation. For a read or find operation, as explained above, no lock on the global data map is required for the response message flow. Thus, when a response message flow performs a read operation on the global data map and extracts the "value" for an item in the map which corresponds to a request ID, the response message flow marks a field in the item as "used". This mark may include a flag or other appropriate identifier which indicates that the key-value pair in the item has been read by the response flow. Consequently, the item is no longer needed in the global data map. In a separate thread (e.g., a "clean up" thread), the message broker application performs a delete operation to remove the item from the map. This clean up thread comprises a single batch delete operation which detects the items marked as "used" in the global data map and removes these marked items from the map. The clean up thread may run at periodic intervals. Using a separate batch thread to perform the delete operations reduces the wait time in all response message flows, since no lock is required in the response message flows. However, each time the clean-up thread is invoked, a lock is still required to perform the delete operations. The wait time penalty for acquiring a lock for the clean up thread is much lower and is less frequent compared with the wait time incurred for performing a delete operation in each and every response flow.

FIG. 7 illustrates a global data map in accordance with the illustrative embodiments. In this illustrative example, global data map 700 comprises a request ID field 702, a value field 704, and a used field 706. As known in the art, when requests arrive at the message broker application, a request ID is assigned to each request. Information collected at a user exit in the message broker application may be passed between message flows using global data map 700. An item such as item 708 is first created in global data map 700 by the request message flow performing an insert operation. The insert operation comprises inserting the request ID for the request into request ID field 702, and the information collected by the user exit into value field 704 of item 708 to form a key-value pair (e.g., reqestID1 and T1).

Global data map 700 also comprises special mapping properties according to the illustrative embodiments for use in both insert operations and delete operations. For an insert operation, a special property is provided which prevents iterators to existing items in the map from being invalidated due to the insertion of a new item. The special property prevents iterators to existing items in the map from being invalidated during the insertion operation to enable other message flows to concurrently access existing items in the global data map during the insert operation. This special mapping property may be implemented when inserting new items into the map by always having the new items appended at the end of the map. Similarly, for a delete operation, a special property is provided which prevents iterators to existing items in the map from being invalidated due to the deletion of an item in the map. This special property also prevents iterators to existing items in the map from being invalidated during the deletion operation to enable other message flows to concurrently access existing items in the global data map during the delete operation. This special mapping property may be implemented when removing items from the map using a batch delete operation, or clean up thread. The clean up thread will remove only items marked in the map as "used", and non-used items are not affected.

Global data map 700 also is shown to comprise used field 706. Used field 706 is used to indicate whether the item comprising the used field should be removed from global data map 700. Used field 706 may be marked as ready for deletion by a response message flow. For instance, when a response message flow performs a read operation on item 708 in global data map 700, response message flow also marks the used field in item 708. This mark may include any suitable identifier (e.g., TRUE, USED, etc.) which indicates that the key-value pair in item 708 has been read by the response flow and is no longer needed. Used field 706 is read by a separate clean up thread in the message broker application which performs a batch delete operation to remove all items in the map where used field 706 is marked. The clean up thread may be invoked at periodic intervals. Although a lock is still required on global data map 700 each time the clean-up thread is invoked to perform the delete operation, the wait time penalty for acquiring a lock for the clean up thread is lower and less frequent compared with the wait time incurred for performing a delete operation in each and every response flow.

FIG. 8 is an example of pseudocode illustrating locks required for a web request in accordance with the illustrative embodiments. Although the pseudocode in this example is directed to calculating the round trip time of a request, the pseudocode example is intended to show that, in contrast with pseudocode 500 in FIG. 5, a lock is not required to be performed in the response message flow in accordance with the illustrative embodiments.

Pseudocode 800 comprises only one critical section 802 which requires a lock to be acquired. A lock on the global data map is first obtained in step 804 by request message flow thread 806. A start_time (T1) of the request is then measured and inserted, along with a unique request ID for the request message flow thread, into the global data map in step 808. The lock is then released by the request message flow thread in step 810. Thus, with the illustrative embodiments, a lock is still required in the request message flow in order to insert an item (containing information to be passed to the response message flow) into the global data map.

In contrast with request message flow thread 806, response flow thread 812 does not require a lock to be obtained to access the global data map. To access the value in the global data map which corresponds to the request ID passed from request message flow thread 806, response flow thread 812 only needs to perform a read or find operation on the item in the map in step 814. Response flow thread 812 does not need a lock for the read operation, since, as previously discussed, message broker applications will not have more than one thread trying to read and remove the same item in the map at any given time. Consequently, the request message flow having a particular request ID will always be processed by the message broker application before processing the response message flow with the same request ID. Thus, the sequential nature of access in message broker applications and the special properties of the global data map described in FIG. 7 allow response flow thread 812 to read the item in the global data map without having to obtain a lock on the map. In addition, step 814 also marks a field in the item as "used". This mark may include a flag or other appropriate identifier which indicates that the key-value pair in the item has been read by the response flow. Consequently, the mark indicates that the item is no longer needed in the global data map.

It should be noted that, in contrast with pseudocode 500 in FIG. 5, response flow thread 812 does not contain a delete operation for the read item. The delete operation in each response message flow is delegated to a dedicated clean up thread. The clean up thread comprises a single batch delete operation which detects the items marked as "used" in the global data map and removes these marked items from the map. Using a separate batch thread to perform the delete operations reduces the wait time in all response message flows, since no lock is required in the response message flows.

FIG. 9 illustrates pseudocode for deleting used items in accordance with the illustrating embodiments. Pseudocode 900 comprises code employed by the clean up thread in the message broker application. The clean up thread is a single batch delete operation invoked at periodic intervals to clean up used items in the global data map.

Pseudocode 900 acquires a lock on the global data map in step 902 in order to perform the delete operations. Each item in the global data map is examined to identify which items are marked as "used" in step 904. If the used field in the global data map is thus marked, that item is deleted in step 906. This deletion process is performed for each marked item in the map. Once all of the marked items have been removed, the clean up thread releases the lock in step 908. Using a separate clean up thread for marked items in this manner results in a wait time penalty for acquiring a lock that is much lower and less frequent than the wait time incurred for performing a delete operation in each and every response flow.

FIG. 10 is a flowchart of a process for minimizing the message flow wait time for management user exits in a message broker application in accordance with the illustrative embodiments. The process described in FIG. 10 may be implemented in a message broker application which comprises an algorithm that performs read operations on the global data map separately from the delete operations to eliminate the need to acquire a lock in the response message flows, and which utilizes a global data map comprising the properties described in FIG. 7. The process reduces the amount of time user exits in request/response message flows must wait to access a global data map when processing a request.

The process begins when a request from a client is received at the message broker application (step 1002). Upon receiving the request, the message broker application generates a unique request ID for the request (step 1004). The message broker application processes the request message flow, and user exits at various points in the request message flow collect management information about the request (step 1006). This management information may include monitoring data used to determine the performance of the message broker application in processing the request.

When a user exit collects information about the request, the request message flow acquires a lock on the global data map (step 1008). The request message flow inserts an item in the global data map which comprises the unique request ID assigned to the request and the information (value) collected by the user exit (step 1010). This new item forms a key-value pair for the request. It should be noted that since the global data map comprises the special properties as described in FIG. 7, the insert operation in this process does not invalidate any iterators pointing to existing items in the global data map. Consequently, any other message flow may access existing items in the data map concurrently to read other items in the map while this request message flow has a lock on the map, since the iterators in the map are not changed due to the insert operation.

Once the insert operation is complete, the request message flow releases the lock on the global data map (step 1012). The request (including the request ID) is provided to a back-end server (step 1014). The back-end server processes the request and provides a response to the message broker application (step 1016).

When the response is received at the message broker application, user exits at various points in the response message flow collect management information about the response (step 1018). The response message flow uses the request ID passed in the request to access the global data map (step 1020). The response message flow may access the data map by reading or finding an item with a key that matches the request ID, and obtaining the value in the key-value pair. It should be noted that, since the response message flow is a sequential process always occurring after the request message flow, and since the response message flow is only reading information from the global data map, the response message flow does not need to acquire a lock on the data map to access the map. Thus, the wait time for the response message flow may be reduced since no lock is required. When the response message flow accesses the global data map, the response message flow reads the key-value pair in the data map and marks a used field in the data map corresponding to the key-value pair (step 1022). The used field in the global data map indicates the items in the map which are marked for removal from the map.

The response message flow then processes the information collected by the user exits and the values obtained from the global data map and stores and provides the processed information to a user (step 1024).

Figure 11:
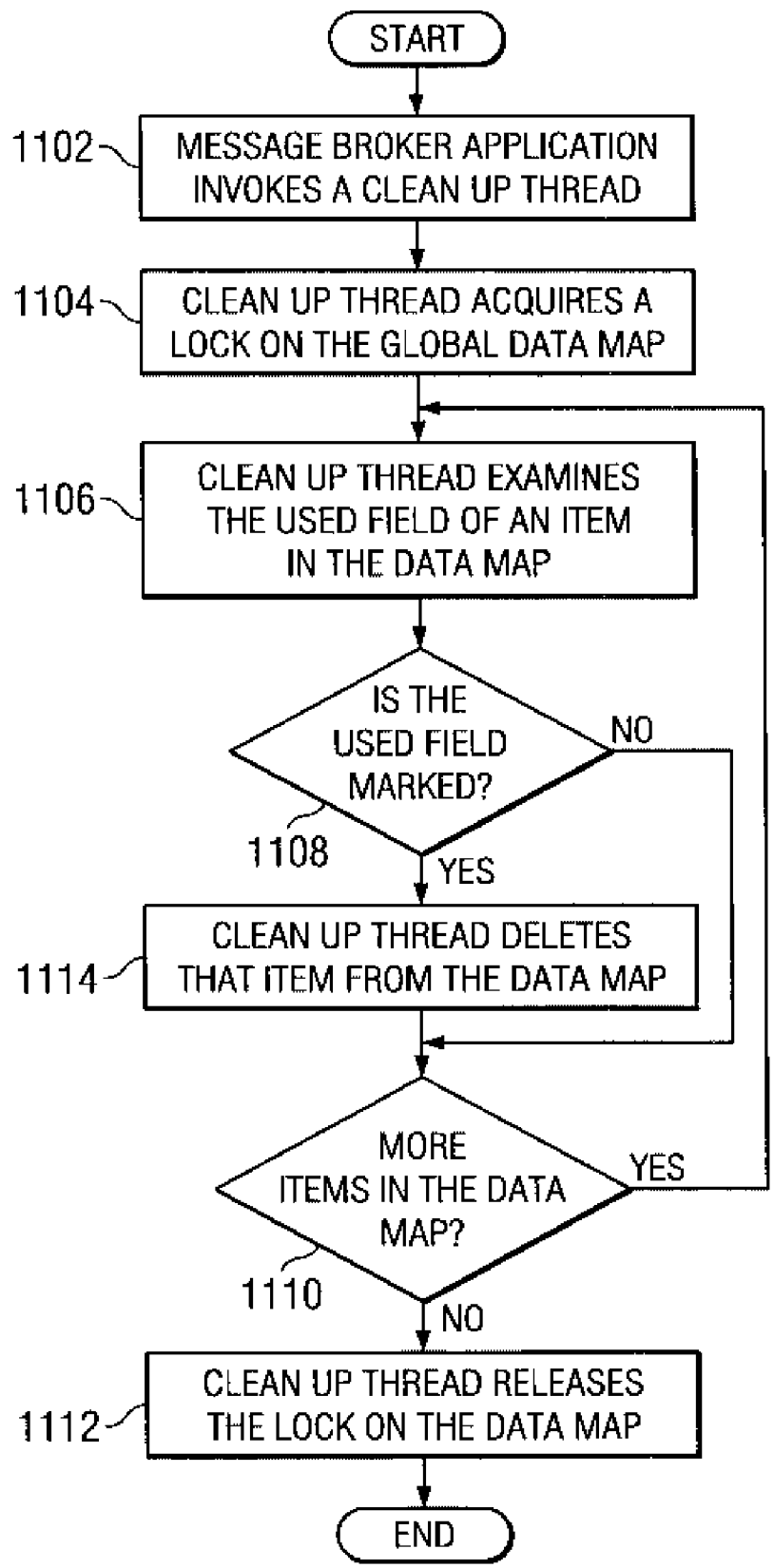
FIG. 11 is a flowchart of a process for performing a batch delete operation in a message broker application in accordance with the illustrative embodiments.

FIG. 11 is a flowchart of a process for performing a batch delete operation in a message broker application in accordance with the illustrative embodiments. The process described in FIG. 11 may be implemented in a message broker application to reduce the wait time incurred by response message flows by delegating all delete operations to be performed by a separate batch delete thread.

The process begins when a clean up thread is invoked in the message broker application (step 1102). The clean up thread acquires a lock on the global data map (step 1104). The clean up thread examines the used field of an item in the data map (step 1106). A determination is made at each item whether the used field is marked (step 1108). If the used field of an item is not marked ("no" output of step 1108), the process then makes a determination if there are any more items in the data map to examine (step 1110). If there are more items in the data map to examine ("yes" output of step 1110), the process loops back to step 1106 to examine the used field of the next item in the global data map. If there are no more items in the data map to examine ("no" output of step 1110), the clean up thread releases the lock on the map (step 1112), with the process terminating thereafter.

Turning back to step 1108, if the used field of an item is marked ("yes" output of step 1108), the clean up thread deletes that item from the data map (step 1114). The process then makes a determination if there are any more items in the data map to examine (step 1110). If there are more items in the data map to examine ("yes" output of step 1110), the process loops back to step 1106 to examine the used field of the next item in the global data map. If there are no more items in the data map to examine ("no" output of step 1110), the clean up thread releases the lock on the map (step 1112), with the process terminating thereafter.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing message flow wait time in a message broker application, the computer implemented method comprising:
    responsive to receiving a request at a message broker application, processing the request in a request message flow and a response message flow,
    wherein processing the request in the response message flow comprises:
        collecting information about the response message flow at user exits in the response message flow;
        using a unique request identifier for the request passed to the response message flow from the request message flow to access a key-value pair in a global data map without acquiring a lock on the global data map;
        reading a value comprising information about the request message flow in the key-value pair; and
        generating management information about the request based on the information about the request message flow and the information about the response message flow.

2. The computer implemented method of claim 1, wherein processing the request in the request message flow comprises:
    generating the unique request identifier for the request;
    collecting information about the request message flow at user exits in the request message flow;
    acquiring a lock on the global data map;
    performing an insert operation of the unique request identifier and the information about the request to form the key-value pair in the global data map;
    releasing the lock on the global data map when the insert operation is complete; and
    passing the unique request identifier to the response message flow.

3. The computer implemented method of claim 1, wherein reading a value in the key-value pair further includes:
    marking the key-value pair in the global data map for deletion at a later time.

4. The computer implemented method of claim 3, further comprising:
    invoking a batch delete operation to delete marked key-value pairs in the global data map, wherein the batch delete operation is contained in thread separate from a thread for the response message flow.

5. The computer implemented method of claim 4, wherein the batch delete operation acquires a lock on the global data map, deletes each marked key-value pair in the global data map, and releases the lock on the global data map.

6. The computer implemented method of claim 1, wherein the information about the request message flow and the information about the response message flow comprises data for monitoring performance of the message broker application in processing the request.

7. The computer implemented method of claim 1, wherein the unique request identifier is used as a key to a key-value pair in the global data map.

8. The computer implemented method of claim 1, wherein the global data map comprises a property for maintaining validity of iterators that point to existing key-value pairs in the global data map when inserting a new key-value pair into the global data map.

9. The computer implemented method of claim 1, wherein the global data map comprises a property for maintaining validity of iterators that point to existing key-value pairs in the global data map when a key-value pair is deleted from the global data map.

10. The computer implemented method of claim 9, wherein maintaining the validity of iterators that point to existing key-value pairs when inserting a new key-value pair into the global data map allows other response message flows to concurrently access the existing key-value pairs while the global data map is locked by the request message flow.

11. The computer implemented method of claim 9, wherein maintaining the validity of iterators that point to existing key-value pairs when deleting a key-value pair into the global data map allows other response message flows to concurrently access the existing key-value pairs while the global data map is locked by the request message flow.

12. The computer implemented method of claim 1, wherein access patterns of the message broker application allow the response message flow to access the global data map without acquiring a lock.

13. A data processing system for managing message flow wait time in a message broker application, the data processing system comprising:
   a bus;
   a storage device connected to the bus, wherein the storage device contains stores computer usable code;
   at least one managed device connected to the bus;
   a communications unit connected to the bus; and
   a processing unit connected to the bus, wherein the processing unit executes the computer usable code to process, in response to receiving a request at a message broker application, the request in a request message flow and a response message flow, wherein the processing unit executes the computer usable code to process the request in a response message flow by collecting information about the response message flow at user exits in the response message flow, using a unique request identifier passed to the response message flow from the request message flow to access a key-value pair in a global data map without acquiring a lock on the global data map, reading a value comprising information about the request message flow in the key-value pair, and generating management information about the request based on the information about the request message flow and the information about the response message flow.

14. A non-transitory computer readable medium having stored thereon a computer program product including computer usable program code that is executable by a computer for managing message flow wait time in a message broker application, comprising:
   computer usable program code for processing, in response to receiving a request at a message broker application, the request in a request message flow and a response message flow,
   wherein the computer usable program code for processing the request in the response message flow comprises:
      computer usable program code for collecting information about the response message flow at user exits in the response message flow;
      computer usable program code for using a unique request identifier passed to the response message flow from the request message flow to access a key-value pair in a global data map without acquiring a lock on the global data map;
      computer usable program code for reading a value comprising information about the request message flow in the key-value pair; and
      computer usable program code for generating management information about the request based on the information about the request message flow and the information about the response message flow.

15. The non-transitory computer readable medium of claim 14, wherein the computer usable program code for processing the request in the request message flow comprises:
   computer usable program code for generating the unique request identifier for the request;
   computer usable program code for collecting information about the request message flow at user exits in the request message flow;
   computer usable program code for acquiring a lock on the global data map;
   computer usable program code for performing an insert operation of the unique request identifier and the information about the request to form the key-value pair in the global data map;
   computer usable program code for releasing the lock on the global data map when the insert operation is complete; and
   computer usable program code for passing the unique request identifier to the response message flow.

16. The non-transitory computer readable medium of claim 14, wherein the computer usable program code for reading a value in the key-value pair further includes:
   computer usable program code for marking the key-value pair in the global data map for deletion at a later time.

17. The non-transitory computer readable medium of claim 16, further comprising:
   computer usable program code for invoking a batch delete operation to delete key-value pairs in the global data map, wherein the batch delete operation is contained in thread separate from a thread for the response message flow.

18. The non-transitory computer readable medium of claim 17, wherein the batch delete operation acquires a lock on the global data map, deletes each marked key-value pair in the global data map, and releases the lock on the global data map.

19. The non-transitory computer readable medium of claim 14, wherein the global data map comprises a property for maintaining validity of iterators that point to existing key-value pairs in the global data map when inserting a new key-value pair into the global data map, and wherein the global data map comprises a property for maintaining validity of iterators that point to existing key-value pairs in the global data map when a key-value pair is deleted from the global data map.

20. The non-transitory computer readable medium of claim 19, wherein maintaining the validity of iterators that point to existing key-value pairs when inserting a new key-value pair into the global data map allows other response message flows to concurrently access the existing key-value pairs while the global data map is locked by the request message flow, and wherein maintaining the validity of iterators that point to existing key-value pairs when deleting a key-value pair into the global data map allows other response message flows to concurrently access the existing key-value pairs while the global data map is locked by the request message flow.

* * * * *